United States Patent [19]
Brunner et al.

[11] Patent Number: 4,987,794
[45] Date of Patent: Jan. 29, 1991

[54] STROKE ADJUSTING APPARATUS FOR A PUNCHING PRESS

[75] Inventors: Martin Brunner; Helmut Messner, both of Arbon, Switzerland

[73] Assignee: Bruderer A.G., Arbon, Switzerland

[21] Appl. No.: 399,707

[22] Filed: Aug. 28, 1989

[30] Foreign Application Priority Data

Aug. 31, 1988 [CH] Switzerland ........................ 3240/88

[51] Int. Cl.[5] .............................................. F16H 21/20
[52] U.S. Cl. .................................. 74/571 M; 83/530; 83/628; 100/257
[58] Field of Search ............... 74/571 M, 836; 83/248, 83/530, 628; 100/257

[56] References Cited

U.S. PATENT DOCUMENTS 4,748,883 6/1988 Portmann ......................... 83/628 X
4,785,732 11/1988 Czapka et al. ............... 74/571 M X

FOREIGN PATENT DOCUMENTS 2534626 3/1976 Fed. Rep. of Germany .
2155463 5/1973 France .
542711 11/1973 Switzerland .
2189731 11/1987 United Kingdom .

*Primary Examiner*—Allan D. Herrmann
*Attorney, Agent, or Firm*—Ladas & Parry

[57] ABSTRACT

A pusher rod extends lengthwise through the eccentric shaft. An additional disk clutch is located inside of the flywheel, which disk clutch is connected to a shaft section, which engages the pusher rod via a screw thread connection. This allows the drive of the punching press to translatorically shift the pusher rod via the further disk clutch. The pusher rod operates the movement of a locking pin, which locks the eccentric shaft to the eccentric bushing by a corresponding translatoric movement. The pusher rod operates furthermore a braceable coupling disk which transmits the driving force from the eccentric shaft to the drive apparatus of the workpiece feed drive. In order to operate these control units when adjusting the stroke of the press it is merely necessary to operate the machine drive in one or the other sense of rotation causing a corresponding closing or opening of clutches and locking members. No further drives are necessary for generating any control movements necessary for the adjusting of the stroke of the punching press. Furthermore, all control movements originate from the side of the flywheel such that a compact design is arrived at.

10 Claims, 1 Drawing Sheet

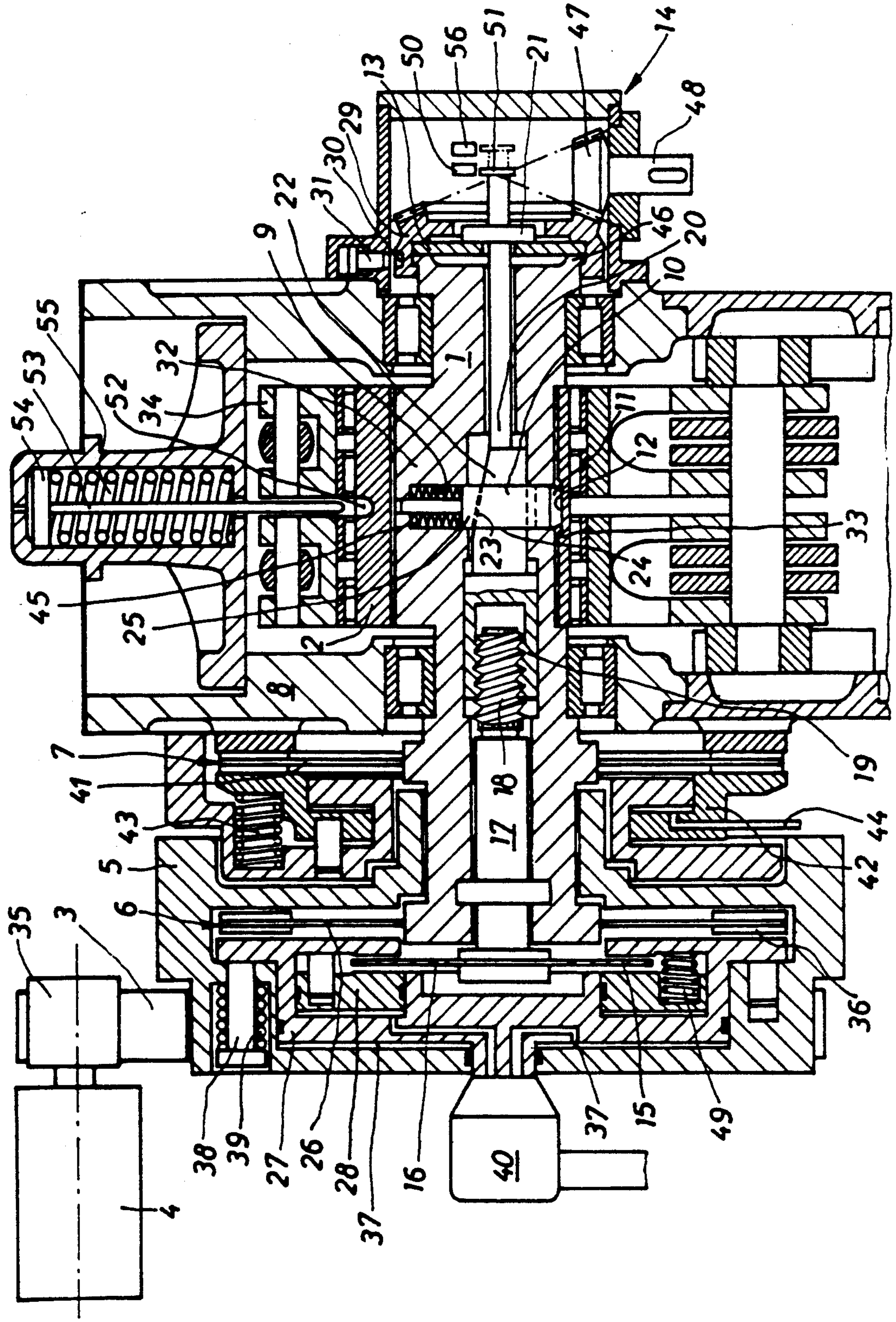

STROKE ADJUSTING APPARATUS FOR A PUNCHING PRESS

BACKGROUND OF THE INVENTION

1. Field of the Invention

The present invention relates to a stroke adjusting apparatus for an adjusting of the stroke of a punching press which includes an eccentric shaft and an eccentric bushing supported thereupon, which eccentric shaft and bushing form a double eccentric, further a means for driving the punching press and a drive flywheel driven by said driving means, a disk clutch arranged to operate between the drive flywheel and the eccentric shaft and operative to make or break, respectively, the drive connection between the drive flywheel and the eccentric shaft, a disk brake operative to act onto the eccentric shaft, a spring biassed locking pin guided in a radial bore located in the eccentric shaft and operative to selectively lock the eccentric bushing to the eccentric shaft.

2. Description of the Prior Art

In commonly known punching presses the adjusting of the stroke proceeds hydraulically or mechanically and the adjusting mechanism members needed for the adjusting of the stroke are moved or driven, respectively, by additional or auxiliary drives and extend from that end area of the eccentric shaft into the inside of the shaft which is remote from the drive flywheel. If such punching press is not a double-stroke press but a multiple-stroke press, it is necessary to adjust accordingly the stroke of the feed of the workpiece feeding apparatus cooperating with the punching press anew after each adjusting of the stroke of the punching press. The drive proper for mentioned workpiece feeding apparatus is also drivingly connected to the eccentric shaft of the punching press such that in order to newly set the upper dead point and lower dead point the drive connection between the eccentric shaft and the workpiece feeding apparatus must be severed. To this end the known punch presses have also additional drives for the operating of the corresponding adjusting members which are also located at that end section of the eccentric shaft which is remote from the flywheel.

Accordingly, these commonly known designs incorporate a rather intrinsic structure.

SUMMARY OF THE INVENTION

It is, therefore, a general object of the present invention to provide a stroke adjusting apparatus for an adjusting of the stroke of a punching press which does not need any additional drives such that a much simpler and more compact overall structure can be arrived at.

A further object of the present invention is to provide a stroke adjusting apparatus comprising a control mechanism extending through the eccentric shaft, a further disk clutch arranged to operate between the control mechanism and the flywheel allowing an operating of the control mechanism by the flywheel, which control mechanism controls the moving of the locking pin into and out of the eccentric bushing, and in which the means for driving the punching press comprises a positionable drive.

Yet a further object is to provide a stroke adjusting apparatus, in which the control mechanism comprises a shaft section which is rotatably supported in the eccentric shaft, secured against an axial movement and coupled to the clutch disk of the further disk clutch to rotate therewith and adjoined by a threaded section threaded into a thread of a pusher rod which is translatorically movable inside of the eccentric shaft, further in which the pusher rod and the locking pin include mutually cooperating force transmitting means for changing a translatory movement of the pusher rod directed in the axial direction of the eccentric shaft into a movement of the locking pin directed in a radial direction thereof.

In case of multiple-stroke punching presses which include a braceable coupling disk which in its braced condition interconnects the eccentric shaft with the drive for the work feed driving apparatus in a force locked manner, the control mechanism may also control the bracing and relaxing of the braceable coupling disk. In such case the pusher rod of the control mechanism includes preferably a collar abutting such braceable coupling disk, by means of which collar the condition of tension, i.e. of the bracing of this coupling disk, can be adjusted dependent on the axial position of the pusher rod.

BRIEF DESCRIPTION OF THE DRAWING

The invention will be better understood and objects other than those set forth above will become apparent when consideration is given to the following detailed description thereof. Such description makes reference to the annexed drawing, wherein:

The single FIGURE illustrates a view of a section through a preferred embodiment of the inventive apparatus.

DESCRIPTION OF THE PREFERRED EMBODIMENT

An eccentric shaft 1 is supported for rotation in the frame 8 of the punching press. This eccentric shaft 1 includes an inner eccentric section 32, on which an eccentric bushing 2 is supported by means of bearings 33. The illustrated embodiment shows two connecting rods 34 supported in turn on the eccentric bushing 2, which connecting rods 34 are coupled in turn to the well-known (not specifically illustrated) ram of the punching press.

The driving of the punching press is made by the machine drive 4, which is a so-called positionable drive having a correspondingly controlled electro-motor, e.g. a DC-motor. This means that a respective rotational position of the rotor of such motor when the rotor is at rest can be controlled exactly. Such motors are generally known and thus a detailed description is not necessary. This motor drives a belt pulley 35, which is drivingly connected to the drive flywheel 5 by one or a plurality of belts 3 such as e.g. cone belts. The driving of the eccentric shaft 1 by mentioned drive flywheel proceeds via a disk clutch 6. This disk clutch includes a clutch disk 26, which is rigidly connected to the eccentric shaft 1. The clutch disk 26 includes friction linings 36. The clutch disk 26, i.e. specifically its friction linings 36 are located inside of the drive flywheel 5 and specifically between the flywheel 5 and an annular piston 27. This annular piston 27 is supported via bolts 38 in the drive flywheel 5 for positive rotation therewith but axially movable thereto. Tension springs 39 act onto these bolts 38, which tension springs 39 bias the annular piston 27 away from mentioned clutch disk 26. The pressurized air of the pneumatic control mechanism is fed into the annular space 37 via a feeding unit 40. Accordingly, if pressurized air acts onto the annular piston 27, it will be urged against the restoring force of the tension springs 39 against and onto the clutch disk 26, i.e. against its friction linings 36, whereby it is deformed to a small extent such that a frictional engaging with the flywheel 5 is produced. In this condition the disk clutch 6 is closed, and accordingly, the eccentric shaft 1 is rotated by the drive flywheel 5 via the clutch disk 26.

The structure includes furthermore a disk brake 7 which is provided with a brake disk 41. The brake disk 41 is also rigidly mounted on the eccentric shaft 1 and acts between the machine frame 8 of the press and an annular piston 42 which can be acted upon by pressurized air and is acted upon by springs 43. These springs 43 urge or bias, respectively, the annular piston 42 to contact or abut, respectively, the frame 8 such that in this condition the eccentric shaft 1 is locked against movement. If pressurized air is fed via the feeding line 44, the annular piston 42 is moved away from the frame 8 such that the eccentric shaft 1 can rotate freely.

Accordingly, if the disk clutch 6 is closed, the disk brake 7 must be released simultaneously such to allow the rotating of the eccentric shaft 1.

A bore hole 9 is located in the inner eccentric section 32 of the eccentric shaft 1. A locking pin 10 is guided in this bore hole 9 for a movement in a radial direction of the eccentric shaft 1. This locking pin engages by means of at least one projection, e.g a toothing 11, into an inner toothing 12 of the eccentric bushing 2 supported on the eccentric shaft 1. If the punching press is designed as double-stroke press, only two recesses located diametrically opposite of each other for the receipt of the roughly toothed shaped designed head end of the locking pin 10 are located in the eccentric bushing 2. According to the FIGURE this locking pin 10 is biassed by means of a spring 45 into engagement with the eccentric bushing 2. The locking pin 10 includes, furthermore, an opening 24, which will be entered into in detail further below. The drive mechanism 14 for the drive of the workpiece feeding apparatus belonging to any punch press is located at the right hand end of the illustrated embodiment. The face end of the eccentric shaft 1 includes an annular projection 46 projecting in axial direction thereof. Furthermore, a bevel gear 29 is provided which drives via a further gear wheel 47 the drive shaft 48 for the workpiece feeding apparatus. A braceable coupling disk or bracing disk, respectively, 13 is arranged between the bevel gear 29 and the annular projection 46 of the eccentric shaft 1. This bracing disk 13 is spring elastic and may have a dish-shaped design. If this coupling disk 13 is braced between the eccentric shaft 1 and the bevel gear 29, which bracing occurs when a movement of the collar 21 towards the left hand based on the drawing is or has been initiated, such that accordingly the eccentric shaft 1 is coupled to the bevel gear 29 and conclusively with the driving unit 14 for the workpiece feed drive. A relaxing of this bracing disk causes correspondingly a breaking of above mentioned drive transmission.

A further disk clutch 15 is located inside of the annular piston 27 of the disk clutch 6. The clutch disk 16 of this disk clutch 15 is firmly mounted to a section 17 of the shaft, which section 17 forms a part of the control mechanism proper. If the clutch disk 16 of this further disk clutch 15 is urged by a further annular piston 28, which is mounted axially displaceable but rotationally arrested supported in the annular piston 27 by means of fed pressurized air against the restoring force of the restoring spring 49 against the annular piston 27, the rotational movement of the flywheel 5 is transmitted via the annular piston 27 and the coupling disk 16 onto the shaft section 17. This shaft section 17 is supported rotationally in the eccentric shaft 1 and held therein against a relative axial movement. At its end opposite of the disk clutch 16 the shaft section 17 is provided with a section 18 having an outer thread. This outer thread section 18 is screwed into an inner thread 19 of a pusher rod 20. This inner thread section 19 is followed by a section of the pusher rod 20 designed as control wedge 22. This control wedge 22 includes an incline 23. The opening 24 of the locking pin 10, which opening has been referred to earlier, includes a wall section, which rests on this incline 23. The push rod 20 extends further until a section carrying the collar 21, by means of which the braceable coupling disk 13 can be braced or relaxed.

A recess 30 is located in the bevel gear 29. This recess 30 is arranged for receipt of a locking bolt 31 guided for longitudinal movement in the frame 8. If the bracing disk 13 is relaxed in which case the transmittal of force to the feed apparatus drive 14 is interrupted, the locking bolt 31 can be slid into the recess 30 and correspondingly arrest the workpiece feed apparatus.

A recess 52 is located in the eccentric bushing 2, which recess 52 is intended for receipt of a locking pin 53, which ends at a piston 54 onto which pressurized air can be brought to act and which locking pin 53 is spring biassed away from the eccentric bushing 2 by means of a restoring spring 55. If pressurized air is made to act onto the piston 54, the locking pin 53 is urged into the recess 52 such that the eccentric bushing 2 is arrested.

The operation of the mechanism described above when adjusting the stroke is as follows.

It shall be assumed that the machine drive 4 has come to a rest, has been stopped. During the operating condition of the apparatus preceding the stopping the further disk clutch 15 has obviously been in its open condition, the disk clutch 6 in its closed condition and the disk brake 7 in its open position. In order to stop the operation of the apparatus the disk clutch 6 has obviously been opened and the disk brake 7 closed.

The machine drive 4 is now at rest and the further disk clutch 15 remains closed. Now the disk clutch 6 is closed and the disk brake 7 opened. Thereafter the machine drive 4 which has been already mentioned is a positional drive having an electro-motor is controlled such that it rotates via the drive belt 3 and the flywheel 5 and the closed clutch 6 the eccentric shaft 1 such that it turns into the position "upper dead center". In this rotational position of the shaft 1 the drive 4 is stopped and thereafter the disk brake 7 is closed and accordingly the eccentric shaft 1 is arrested in mentioned position "upper dead center".

In this position of the shaft 1 the locking bolt 31 is pushed into the recess 30 of the bevel gear 29 and accordingly the drive apparatus 14 for the workpiece feed drive is also locked. Because the eccentric shaft 1 has been arrested in the position "upper dead center", the workpiece feed drive is quite obviously also in the position "upper dead center".

Now, the disk clutch 6 is opened and the further clutch 15 closed. The eccentric shaft 1 remains arrested or locked, respectively, by the disk brake 7. The motor of the machine drive 4 is put into operation such that the coupling disk 16 of the further disk coupling 15 begins to rotate the shaft section 17 of the pusher rod 20. Because the outer thread 18 is in a screw engagement with the inner thread 19, the pusher rod 20 is moved towards the right hand side (based on the FIGURE) until the collar 21 lifts off the braceable coupling disk 13 such that this disk 13 is relaxed and no longer braced between the annular projection 46 and the bevel gear 29. Conclusively the bevel gear 29 is uncoupled from the eccentric shaft 1.

The corresponding position is monitored and controlled, respectively, by means of the switch 50. The drawing illustrates the position of the pusher rod 20 or of the collar 21, respectively, at a just relaxed condition of the braceable coupling disk 13 such that the end disk 51 of the pusher rod 20 which acts onto the switch 50 is located in the position as illustrated in this drawing.

Now the feed of the workpiece feeding apparatus is "deposited or stored", respectively. In the next step the clutch 6 which acts onto the eccentric shaft 1 is closed and the further clutch 15 as well as the brake 7 are opened. The locking pin 10 of the eccentric shaft 1 is inserted in the eccentric bushing 2 due to action of spring 45. Now the motor 4 is again energized, and the eccentric shaft 1 rotated with the eccentric bushing 2 locked thereto into the position "lock". In this position of the shaft 1 and the bushing 2 the recess 52 of the bushing 2 is aligned with the locking pin 53. Pressurized air is made to act onto the piston 54 which causes the locking pin 53 to move against the force of the restoring spring 55 into the recess 52. The pressurized air feed is maintained and accordingly the eccentric bushing 2 is locked against a rotating movement.

For execution of the next step the brake 7 is closed and the disk clutch 6 acting onto the eccentric shaft 1 opened. The eccentric shaft 1 is therefore locked against rotation. At the same time the further disk clutch 15 is closed. The motor of the drive 4 is energized again and accordingly the shaft section 17 is rotated further via the closed further clutch 15 such that the pusher rod 20 and specifically the control wedge 22 having the incline 23 are moved towards the right hand side. The incline 23 cooperates with the wall section 25 of the opening 24 in the locking pin 10 such that the locking pin 10 is urged out of the recess or inner toothing 12, respectively, of the eccentric bushing 2 against the restoring force of the spring 45. The position of the control wedge 22 is monitored by a further limit switch 56, which limit switch 56 cooperates also with the end disk 41 of the pusher rod 20.

Now the connection between eccentric shaft 1 and eccentric bushing 2 has been opened or broken, respectively.

During the next step the further clutch 15 which acts onto the pusher rod 20 and the disk brake 7 is opened, and the disk clutch 6 which cooperates with the eccentric shaft 1 is closed. Thereafter the motor of the drive 4 is again energized and the eccentric shaft 1 rotated because now the disk clutch 6 is closed and rotated until the position "new stroke" has been reached, i.e. the position of the eccentric shaft 1 which is necessary for operating at a newly selected stroke. In case of a two-stroke apparatus the eccentric shaft 1 is rotated obviously exactly by 180°, and in case of a multiple-stroke apparatus by that number of degrees which is necessary to attain the new stroke. During this rotating movement of the eccentric shaft 1 the eccentric bushing 2 remains locked due to the locking pin 53 which is inserted in the recess 52 and kept in this position. Because the eccentric shaft 1 rotates, the eccentric bushing 2 is obviously moved together with the connecting rods 34 and the (not illustrated) ram vertically relative to the frame 8 by a measure necessary to obtain the new stroke.

Now the new stroke has been set.

The next step involves now the closing of the disk brake 7 and of the further disk coupling 15 acting onto the pusher rod 20 and the opening of the clutch 6 acting onto the eccentric shaft 1. The motor of the drive 4 is rotated in the opposite sense of rotation and accordingly the shaft section 17 is rotated back via the closed further clutch 15 following in that the pusher rod 20 is pulled back (towards the left based on the drawing) by the interacting of the outer thread 18 and the inner thread 19. Accordingly, the control wedge 22 including its incline 23 is moved back (towards the left) until the locking pin 10 has completely engaged into the inner toothing 12 (or recess, respectively) such that now the eccentric bushing 2 is locked to the eccentric shaft 1, and now in the position "new stroke".

Thereafter the clutch 6 acting onto the eccentric shaft 1 is closed and the further clutch 15 of the pusher rod 20 as well as the brake 7 are opened. Thereafter the feed of pressurized air to the locking pin 53 is stopped such that the locking pin 53 moves out of the recess 52 of the eccentric bushing 2 and accordingly the locking of the eccentric bushing 2 to the machine frame 8 is released. The motor of the drive 4 is energized again and in the closed condition of the coupling 6 the eccentric shaft-1 rotated by such an amount that it arrives at the position which corresponds to the upper dead center of the new stroke. Quite obviously the position of the upper dead center has changed because the eccentric shaft 1 has been rotated relative to the eccentric bushing 2.

During the entire stroke changing operation such as described above the drive apparatus 14 for the workpiece feed drive apparatus has been uncoupled from the eccentric shaft 1 and accordingly the position of the workpiece feed drive has not been changed. It is still located in the position "upper dead center" because the bracing disk 13 has been relaxed, i.e. uncoupled, and the locking bolt 31 has been moved into the bevel gear 29 keeping same arrested.

Now the disk brake 7 is closed and the clutch 6 acting onto the eccentric shaft 1 is opened such that the eccentric shaft 1 is arrested. The further clutch 15 which acts onto the pusher rod 20 is now closed, and after energizing the motor the shaft section 17 rotated still further back and accordingly, the pusher rod 20 is also pulled further back. Conclusively, the collar 21 at the outer end of the pusher rod 20 is pulled the longer the stronger against the braceable coupling disk 13 which is arranged between the eccentric shaft 1 and the bevel gear 29 of the drive apparatus 14 for the workpiece feed apparatus.

The further disk clutch 15 on the one hand and the braceable coupling disk 13 on the other hand are designed such that the relation: torque transmittable by the bracing disk 13 to: torque transmittable by the further disk clutch 15 is selected such that upon a continued rotating of the closed disk clutch 15 the clutch begins to slip not earlier than after the braceable coupling disk 13 has been braced or tensioned, respectively, to such an extent that it can transmit the torque necessary during normal operation. Accordingly the pusher rod 20 moves towards the left until the disk clutch 15 begins to slip and the braceable coupling disk 13 has been braced or tensioned, respectively, by the collar 21 to such an extent that the torque during operation can be transmitted. Accordingly, a mechanism is provided which operates as a torque wrench.

After the braceable coupling disk 13 has been braced by the above described operation, the locking bolt 31 is lifted out of the recess 30 of the bevel gear 29. Finally, the further disk coupling 15 is opened and now the adjusting of the stroke is terminated and the punching press can begin to operate with the new stroke.

While there is shown and described a present preferred embodiment of the invention, it is to be distinctly understood that the invention is not limited thereto, but may be otherwise variously embodied and practiced within the scope of the following claims.

We claim:

1. In a stroke adjusting apparatus for adjusting the stroke of a punching press, said punching press having a frame, an eccentric shaft rotatably on said frame, an eccentric bushing rotatably supported on said eccentric shaft, whereby said eccentric shaft and bushing form a double eccentric, a drive flywheel, drive means for rotating said drive flywheel, a first a disk clutch operative between said drive flywheel and said eccentric shaft to make and break a drive connection between said drive flywheel and said eccentric shaft, a disk brake operative on said eccentric shaft, and a spring biassed locking pin guided in a radial bore in said eccentric shaft and operative to selectively lock said eccentric bushing to said eccentric shaft, the improvement comprising:
   - a control mechanism extending through said eccentric shaft; and
   - a further disk clutch operative between said control mechanism and said drive flywheel for operating said control mechanism with said drive flywheel,
   - said control mechanism being operative to control movement of said locking pin into and out of said eccentric bushing, and
   - said drive means comprising a positionable drive.

2. The apparatus of claim 1, in which said control mechanism comprises a pusher rod and a shaft section, said shaft section being rotatably supported in said eccentric shaft, secured against axial movement and coupled to a clutch disk of said further disk clutch to rotate therewith and having a threaded section threaded into a thread of said pusher rod, said pusher rod being translatably moveable axially inside said eccentric shaft and cooperative with said locking pin in force transmitting means for changing translatory movement of said pusher rod into radial movement of said locking pin.

3. The apparatus of claim 2, in which said force transmitting means comprises a control wedge section of said pusher rod having an incline, and an opening in said locking pin, said opening having a wall section resting on said incline of said control wedge.

4. The apparatus of claim 1,
   - wherein said first disk clutch comprises a pressurized air operated single disk clutch having a first clutch disk fixedly mounted to said eccentric shaft, located inside said drive flywheel and movable to frictionally engage said drive flywheel by action of an axially displaceable first annular piston rigidly mounted thereto, and
   - wherein said further disk clutch comprises a further clutch disk rotationally locked to said control mechanism, located inside said first annular piston and movable into frictional engagement with said first annular piston by a further annular piston mounted inside said first annular piston axially displaceably but fixedly for rotation therewith.

5. The apparatus of claim 1, and further comprising a clutch mechanism operative to make and break a force locked drive connection between said eccentric shaft and a workpiece drive means for driving a workpiece feeding apparatus, said control mechanism being arranged to operate said clutch mechanism.

6. The apparatus of claim 5,
   - in which said clutch mechanism comprises a braceable clutch disk having a braced and a relaxed condition, said braceable clutch disk in said braced condition coupling said eccentric shaft to said workpiece drive means, and
   - in which said control mechanism is further operative to control said braced and relaxed conditions of said braceable clutch disk.

7. The apparatus of claim 6, in which said control mechanism comprises a pusher rod and a shaft section, said shaft section being rotatably supported in said eccentric shaft, secured against axial movement and coupled to a clutch disk of said further disk clutch to rotate therewith and having a threaded section threaded into a thread of said pusher rod, said pusher rod being translatably movable axially inside said eccentric shaft and cooperative with said locking pin in force transmitting means for changing translatory movement of said pusher rod into radial movement of said locking pin, said pusher rod comprising a collar abutting said braceable clutch disk said collar providing said control of said braced and relaxed conditions of said braceable clutch disk in dependence upon said axial translatory movement of said pusher rod.

8. The apparatus of claim 7, in which said workpiece drive means comprises a bevel gear and said braceable clutch disk is between said bevel gear and said eccentric bushing for bracing of said braceable clutch disk between said eccentric bushing and said bevel gear.

9. The apparatus of claim 8, in which said bevel gear comprises a recess for receipt of a locking bolt, said locking bolt being slidingly supported in said frame for locking said workpiece drive means when slid for said receipt in said recess.

10. The apparatus of claim 6, in which a ratio of torque transmittable by said clutch mechanism to torque transmittable by said further disk clutch is such that slipping of said further disk clutch begins after said braceable clutch disk is in said braced condition for transmitting torque for operation, whereby said further disk clutch acts together with said pusher rod as a torque wrench for tensioning said clutch mechanism.

* * * * *